United States Patent Office 2,763,955
Patented Sept. 25, 1956

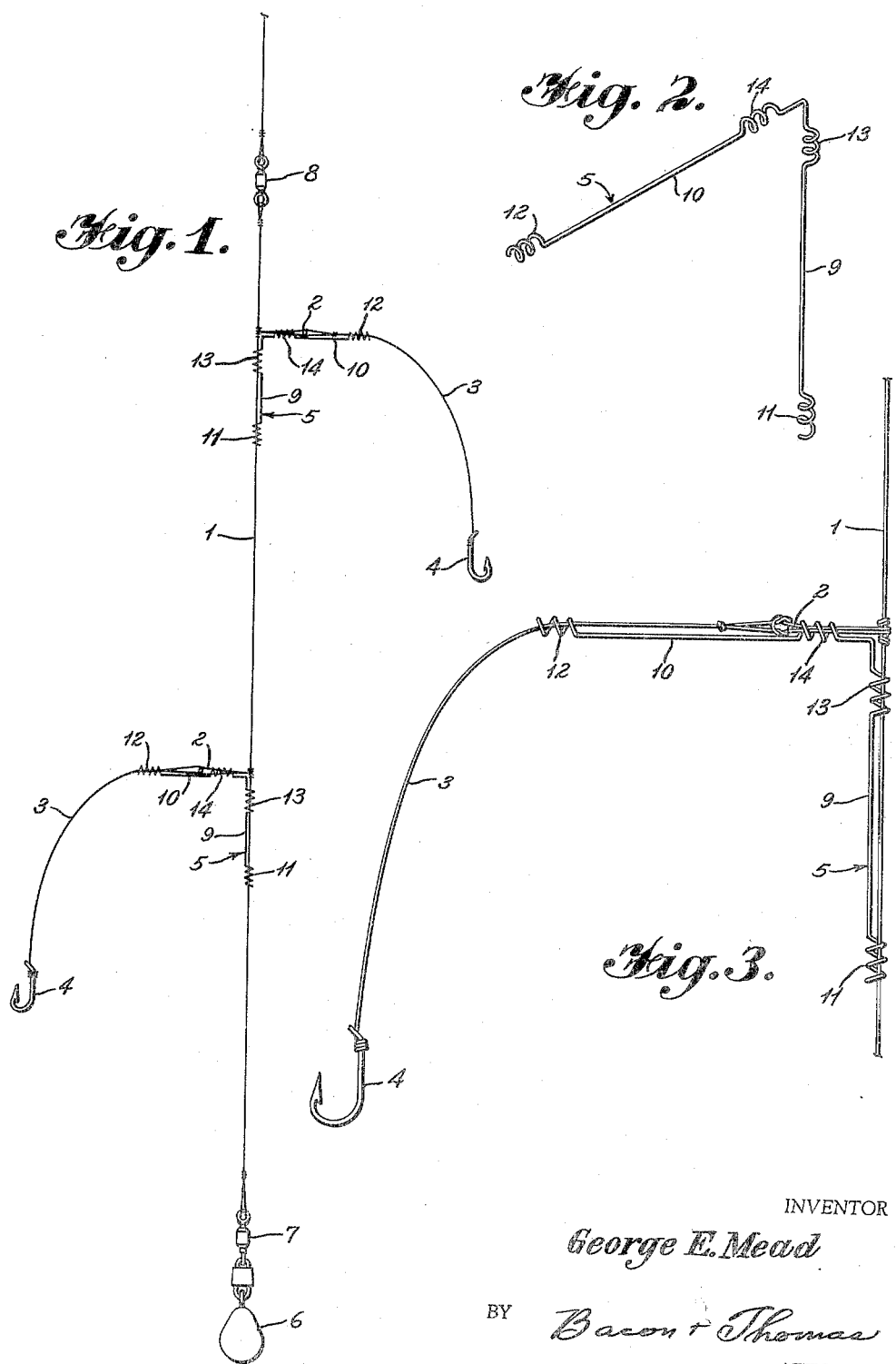

2,763,955

SPREADER DEVICE FOR FISHING TACKLE

George E. Mead, Long Beach, Calif., assignor of one-half to Perry Arant, San Gabriel, Calif.

Application July 12, 1954, Serial No. 442,569

8 Claims. (Cl. 43—42.74)

My invention relates in general to fishing equipment and more particularly to a spreader device adapted to separate a fishhook leader from the fishing line itself.

A primary object of this invention is to provide a spreader device which will hold the baited hook away from the fishing line, thus preventing snarling when in general use, and spinning, wrapping or tangling while casting or during surf fishing, at which time the tackle lies generally parallel with the bottom.

A further object of this invention is to provide a spreader device which will hold the baited hook away from the fishing line while submerged in order to allow the bait to wash with the water currents, thus allowing said bait to assume its most natural condition.

A further object of this invention is to provide a spreader device which can be readily attached to or detached from ordinary fishing lines and leaders.

A further object of this invention is to provide a spreader device which will have enough resiliency to absorb a considerable amount of the shock incurred while casting, thereby reducing the tendency for soft bait to be separated from the hook upon striking the water.

A further object of this invention is to provide a spreader device which is durable and rustproof and which can be easily and economically manufactured.

A further object of this invention is to provide a spreader device which is not permanently attached to either the fishing line or the leader and which therefore may be used over and over again.

Other advantages in the construction and operation of this device will become apparent upon consideration of the following description, together with the accompanying drawings, in which:

Figure 1 is an elevational view of a fishing tackle assembly employing two of the spreader devices;

Figure 2 is a perspective view of the spreader device per se; and

Figure 3 is a fragmentary enlarged view of one of the spreader devices shown in Figure 1.

Referring now in detail to the drawings, the numeral 1 designates the main fishing line which may be formed of any suitable line or leader material and which is provided with longitudinally spaced loops 2 for attachment thereto of ordinary fishhook leaders 3 which in turn are attached to fishhooks 4. These fishhook leaders are held away from the main fishing line 1 by the attachment to said leaders and line of spreader devices generally identified by the numeral 5. At the bottom of the assembly is a weight 6 that is attached to the main line 1 by a swivel 7, while above the assembly is shown a further swivel connection 8 in the main line 1. Each spreader device 5 is formed from a piece of stainless spring wire or any other suitable resilient material bent near its center at substantially right angles to provide two arms 9 and 10. At the outer end of the arms 9 and 10 there are helically coiled portions 11 and 12, respectively, and at the inner ends of the arms 9 and 10 there are similar coiled portions 13 and 14, respectively. All four coiled portions 11, 12, 13 and 14 therefore provide eyelets through which a line or leader may pass and by which the line or leader may be supported. It will thus be seen that one of the arms, 9, for example, is adapted to be attached to the line 1 by placing said line into the innermost convolution of the coil 13 and winding it in the direction of the spiral until the line is in a position extending through the center of the said coil 13. The identical procedure may then be employed to attach the line to the outer coiled portion 11 of the arm 9. Similarly, when the spreader device has been properly attached to the fishing line 1 at a point just below the junction between the line 1 and a fishhook leader 3, then the leader can be attached to the arm 10 at the coiled portions 12 and 14 by manipulation of the leader in the same manner described in connection with the attachment thereof to the line 1. It will be readily observable that although the spreader device is held against movement along the fishing line 1 by the attachment of the arm 10 to the leader 3, which in turn is secured to the loop 2 of said line, said spreader device may be easily detached from the assembly by performing the reverse operations from the ones just described with respect to attachment.

From the foregoing it will be seen that I have provided a new and improved device for separating the baited hook from the fishing line while performing normal fishing operations.

When my device is being used with a tackle assembly for casting, the resiliency of the device as a whole and of the arm 10 in particular will absorb a great deal of the impact normally resulting when the baited hook, after flying through the air, suddenly strikes the water. This in turn lessens the tendency for the bait to be pulled off the hook.

When my device is being used in surf fishing, the fact that the leader and line are separated while resting on the ocean bed tends to deter them from being wrapped around each other by the action of water currents near the ocean bed. The same benefits are obtained in fishing from boats or piers, at which time the main line is substantially vertical and the spreader devices hold the hooks away from said main line so that they cannot tangle therewith.

Although the present invention has been described with respect to a specific embodiment, it should be understood that various modifications and changes in details of construction might be employed without departing from the principles of the invention and the scope of the annexed claims.

I claim:

1. A spreader device for use with fishing tackle embodying a fishing line having a fishhook leader presecured thereto, comprising: a piece of resilient material including arms extending at an angle with respect to each other and one of said arms terminating in helical coil means for attaching the same to said fishing line and the other of said arms terminating in helical coil means for attaching the same to said fishhook leader, said material being of such resiliency that said last-mentioned arm will readily bend to absorb a portion of any force applied to said leader.

2. A spreader device as defined in claim 1, in which the helical coil means comprises at least one convolution having its axis substantially parallel with its associated arm.

3. A spreader device for use with fishing tackle embodying a fishing line having a fishhook leader presecured thereto, comprising: a piece of resilient material including arms extending at an angle with respect to each other, one of said arms having longitudinally spaced helical coil means for attaching the same to said fishing line and the other of said arms having longitudinally spaced helical coil means for attaching the same to said fishhook leader, said material being of such resiliency that said last-mentioned arm will readily bend to absorb a portion of any force applied to said leader.

4. A spreader device as defined in claim 3, wherein the helical coil means comprise coils whose center axes run in substantially the same direction as the arm to which said coils are attached.

5. A spreader device for use with fishing tackle embodying a fishing line having a fishhook leader presecured thereto, comprising: a piece of wire including arms extending at substantially right angles with respect to each other, one of said arms having longitudinally spaced helical coil means for attaching the same to said fishing line and the other of said arms having longitudinally spaced helical coil means for attaching the same to said fishhook leader.

6. A spreader device for use with fishing tackle comprising: a piece of resilient material including arms extending at angles with respect to each other, each of said arms having integral helical coil means adjacent the point of juncture of said arms, and also having integral helical coil means adjacent the outer ends of said arms, whereby one of said arms may be attached to a fishhook leader and the other of said arms may be attached to the fishing line to which said leader is secured.

7. In combination with a fishing line with a fishhook leader presecured at a medial point thereon, a spreader device comprising: a piece of resilient material including arms extending at an angle with respect to each other, one of said arms having means attaching the same to said fishing line and the other of said arms having means attaching the same to said leader, said material being of such resiliency that said last-mentioned arm will readily bend to absorb a portion of any force applied to said leader.

8. In combination with a fishing line having a fishhook leader presecured thereto, a spreader device comprising: a piece of resilient material including arms extending at an angle with respect to each other, each of said arms having helical coil means adjacent the point of juncture of said arms and also having helical coil means adjacent its outer end, one of said arms being attached to said fishhook leader by its associated helical coil means and the other of said arms being attached to said fishing line by its associated helical coil means, said material being of such resiliency that said first-mentioned arm will readily bend to absorb a portion of any force applied to said leader.

References Cited in the file of this patent

UNITED STATES PATENTS

| 243,987 | Shields | July 5, 1881 |
| 1,464,163 | Abernethy | Aug. 7, 1923 |
| 1,720,287 | Moore | July 9, 1929 |
| 2,170,788 | Augenblick | Aug. 22, 1939 |
| 2,222,277 | Baker | Nov. 19, 1940 |
| 2,352,631 | Guarnieri | July 4, 1944 |

FOREIGN PATENTS

| 67,128 | Norway | Nov. 29, 1943 |